United States Patent [19]

Krämer

[11] Patent Number: 5,052,867
[45] Date of Patent: Oct. 1, 1991

[54] METHOD OF PRODUCING PROFILED WORKPIECES

[75] Inventor: Helmut Krämer, Weingarten, Fed. Rep. of Germany

[73] Assignee: Maschinenfabrik Lorenz AG, Ettlingen, Fed. Rep. of Germany

[21] Appl. No.: 558,155

[22] Filed: Jul. 24, 1990

[30] Foreign Application Priority Data

Aug. 25, 1989 [CH] Switzerland .................. 3089/89

[51] Int. Cl.⁵ ............................................. B23D 37/00
[52] U.S. Cl. ...................................... 409/244; 409/59; 409/293
[58] Field of Search ................. 409/58, 59, 244, 131, 409/265, 293, 319, 320, 248, 264, 326, 60

[56] References Cited

U.S. PATENT DOCUMENTS 2,255,221  9/1941  Lapointe ........................... 409/244
3,849,852 11/1974  Billups ............................. 409/244 X
4,401,401  8/1983  Roselip ............................. 409/244

FOREIGN PATENT DOCUMENTS 1264931  3/1968  Fed. Rep. of Germany .
1923118  1/1970  Fed. Rep. of Germany .
2828154  8/1979  Fed. Rep. of Germany ........ 409/58
 378769  2/1940  Italy ................................. 409/59
1168336  7/1985  U.S.S.R. ........................... 409/131
   6739  of 1903  United Kingdom ............... 409/319

Primary Examiner—William Briggs
Attorney, Agent, or Firm—Trexler, Bushnell, Giangiorgi & Blackstone, Ltd.

[57] ABSTRACT

Profiled workpieces are produced in a machine tool having a toolholder for at least one tool and work carrier for the workpieces, there being means for relative reciprocation of said toolholder and carrier. In the course of the reciprocatory movement the tool produces a profile on the workpiece in the direction of movement of the toolholder. The length of the profile in the stroke direction is greater than the length of the stroke movement. To produce the desired tool length, this is divided, in the direction of the relative movement between tool and workpiece, into at least two portions which are produced separately from one another.

21 Claims, 7 Drawing Sheets

METHOD OF PRODUCING PROFILED WORKPIECES

BACKGROUND OF THE INVENTION

The invention relates to a method of producing profiled workpieces on a machine tool in which there is relative reciprocating movement between a holder for a tool and a carrier for the work, whereby the tool in the holder forms a profile on a workpiece held by the carrier In machine tools, the toolholders of which execute a reciprocating stroke movement, the length of the profile to be produced, seen in the direction of the stroke, is limited by the maximum stroke of the tool-holder. A gear generating machine, for example, has a maximum adjustable length of stroke of the ram spindle which carries the toolholder. The maximum generating or profile length which can be produced is limited by this length of stroke. Thus large generating or profile lengths require machine tools, the toolholders of which are able to execute a correspondingly great stroke movement. These machine tools are, however, expensive to procure and maintain. Furthermore, such machine tools have the disadvantage that, as a result of their great length of stroke, the stroke frequency is lower than in machine tools with a short length of stroke. A further disadvantage of the machine tools with a great length of stroke lies in that, as a result of the long contact time between workpiece and tool, the tool life is reduced. The above applies in the same manner to machine tools in which the work-carrier performs the reciprocating stroke movement.

It is an object of the present invention to provide a method by means of which relatively large profile lengths can be produced with a machine tool which has only a limited stroke of its toolholder or work-carrier for this purpose.

SUMMARY OF THE INVENTION

The invention provides a method for producing relatively large profile lengths in which the reciprocating stroke movement between the toolholder and work-carrier is shorter than the length of the profile in the direction of said stroke movement and the profile is divided, in said direction, into at least two portions which are produced separately from one another.

The method may be performed using a single tool or multiple tools. If multiple tools are used they may form respective profiled portions simultaneously.

The invention may be employed, for example, in a gear generating machine, with the tool in the form of a gear shaping cutter working by the generating method, said tool being rotated backwards and forwards about its axis, said rotational movement being related proportionally to the reciprocating stroke movement between tool and workpiece. Between the formation of adjacent profile portions, the axial position of the tool slide and/or of the toolholder for said gear shaping cutter may be altered and the rotational position of the tool and/or of the workpiece may also be altered, depending on the change in axial position.

The direction of relative movement between tool and workpiece may be altered between the formation of two adjacent portions. It is also possible to vary the relative speed of movement between tool and workpiece during the working stroke and/or return stroke of the reciprocating movement.

The method according to the invention may be so performed that the work-carrier and/or the toolholder is adjusted transversely to the line connecting their respective axes, selectively, in conjunction with alteration of the distance between these axes and/or of an axis of rotation of the tool and/or an axis of rotation of the workpiece and/or an angle of inclination between the axis of rotation of the tool and the direction of reciprocating movement.

Several examples of carrying out the method will be explained in more detail below with reference to the accompanying drawings.

DESCRIPTION OF THE PREFERRED EMBODIMENTS

Figure 1:
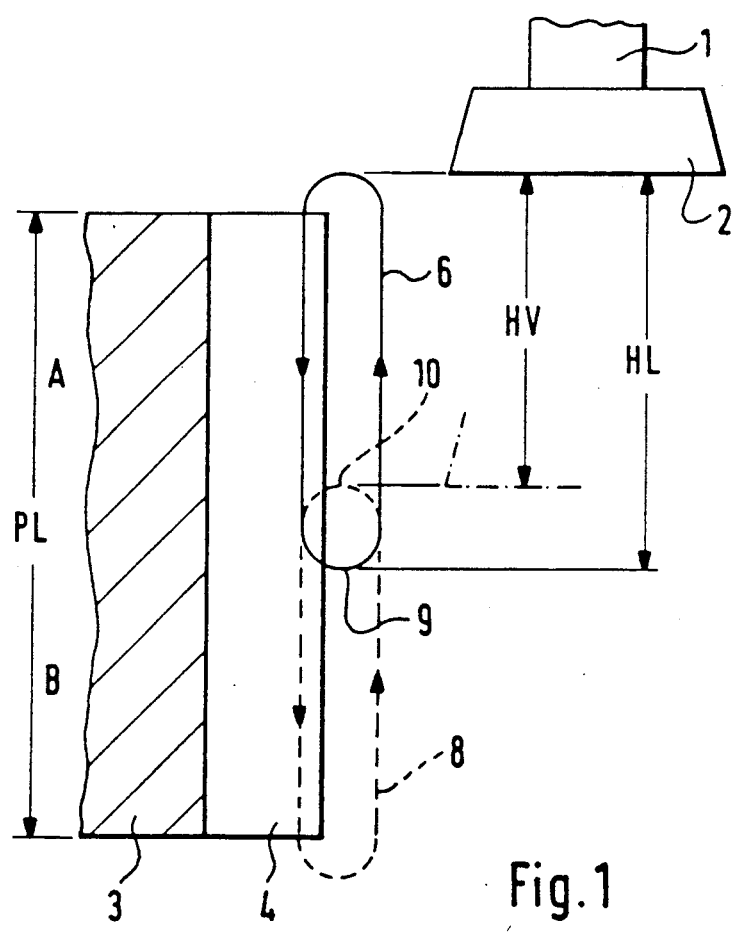
FIG. 1 shows, diagrammatically, a workpiece and a tool for carrying out a first example of the method according to the invention.

FIG. 1 shows a toolholder 1 which forms the reciprocating ram spindle of a gear generating machine which carries a gear shaping cutter as a tool 2. The gear generating machine may itself be of generally conventional form. Such machines are well known to those skilled in the art and fuller descriptions of typical machines may be found in many published sources, including the MAAG Gear Book, published by MAAG Gear-Wheel Co Ltd, Zurich, CH in 1963. For simplicity, therefore, illustration of the conventional features of the machine tool has been omitted from the drawings and the description refers only to those features that are directly relevant to the present invention. As far as concerns the following description, however, it may be mentioned that gear generating machines typically have the toolholder 1 mounted on a ram slide for reciprocating movement. A rotatable carrier is provided for the workpiece and the tool 2 itself may be rotatable about an axis extending in the direction of reciprocating movement.

These machines also have means for relative displacements between the workpiece carrier and the tool in mutually orthogonal axes, as well as means for adjustable inclination of the reciprocation axis to the axis of the workpiece. Modification of the combined reciprocatory-rotary generating movements to relieve the ends of the teeth being cut on the workpiece is another feature of known generating machines and the possible incorporation of such known techniques in the performance of the method according to the invention will also be referred to below.

The maximum length of reciprocating stroke of the toolholder 1 and hence of the tool 2 is designated by HL. During its downward movement, the tool 2 machines the workpiece 3 while during its upward movement it is lifted from the workpiece 3 to be held out of engagement with it and at an adjustable spacing from it. In the use of the method of the present invention, it is a question of producing a profile 4 on the workpiece 3 with the tool 2, the length of which profile is greater than the length of stroke HL.

Figure 2A:
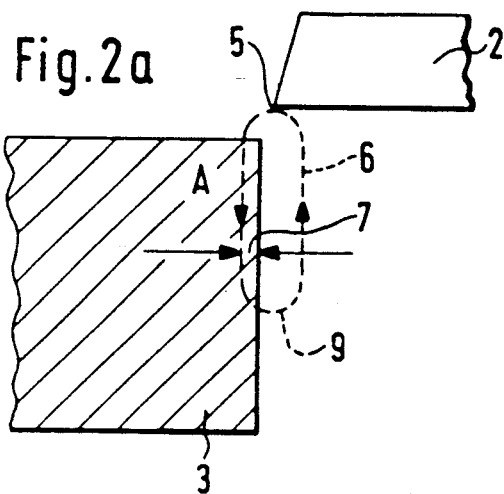
FIG. 2 is an illustration of the method of this first example.

According to FIG. 2a, in the first place a portion A of the profile 4 is machined by the tool 2. In the course of this, the tool tip 5 describes the path 6. As a result, a partial profile is produced in the portion A with a profile depth 7 at the circumference of the workpiece.

Figure 2B:
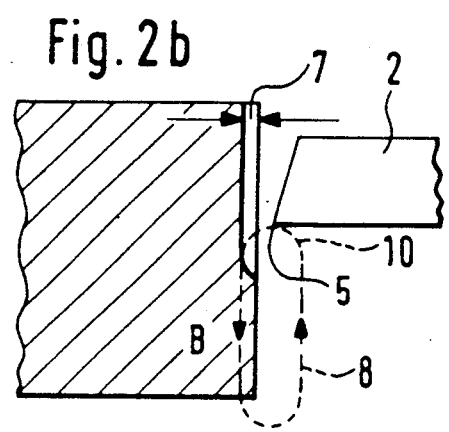

When this partial profile has been produced in the portion A with the profile depth 7, the relative distance between workpiece 3 and tool 2 is altered, as seen in the stroke direction. In this case, it is a matter of the relocation of the stroke position through the distance HV shown in FIG. 1. Then the portion B of the profile following on the portion 7 is produced with the tool 2, during which the tip 5 of the tool 2 describes the path 8. This is illustrated in FIG. 2b. The machining of the portion B is continued to give the profile depth 7 corresponding to the depth in the portion A.

During the machining of the portion A, the runout zone 9 of the tool 2 from the workpiece lies in the region of the workpiece 3. During the machining of the portion B, on the other hand, the entry zone 10 of the tool tip lies in the region of the workpiece 3. The relocation distance HV of the stroke position is selected so that the entry zone 10 overlaps the runout zone 9 as can clearly be seen from FIG. 1. Detail profiles in the portions A and B with the profile depth 7 thus merge continuously one into the other.

Figure 2C:
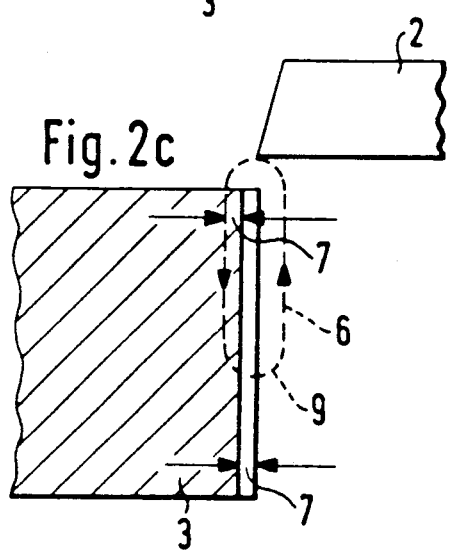
Figure 2D:
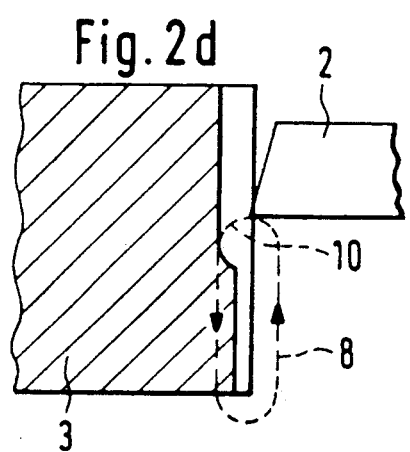

After the above-mentioned partial profile has been produced in the portions A and B, by shifting in the stroke position HV the tool 2 is brought back to the original position for machining the portion A and, in addition, the distance between the tool 2 and the workpiece 3 is reduced. In the next step, therefore, the profile 4 is made deeper in the portion A, as shown in FIG. 2c, by the tool 2 cutting a further profile depth 7. Then, as shown in FIG. 2d, the portion B is machined to the same depth, the stroke position of the tool 2 having first been relocated by the distance HV once more.

Figure 2E:
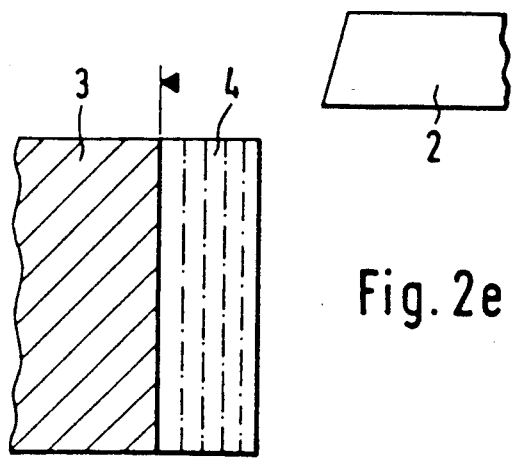

This method of procedure is repeated, if required, until the final profile depth of the profile 4 has been cut as shown in FIG. 2e.

The relocation of the stroke position can be achieved by an axial adjustment device on the toolholder 1 or by adjustment of the tool slide mounting the toolholder 1. In the case of a gear generating machine wherein the toolholder executes an additional rotation during the stroke movement to cut an oblique or helical tooth, the effect is achieved, by an axial adjustment device (not shown), that an uninterrupted continuation of the helical line along the whole profile length PL results.

Figure 3:
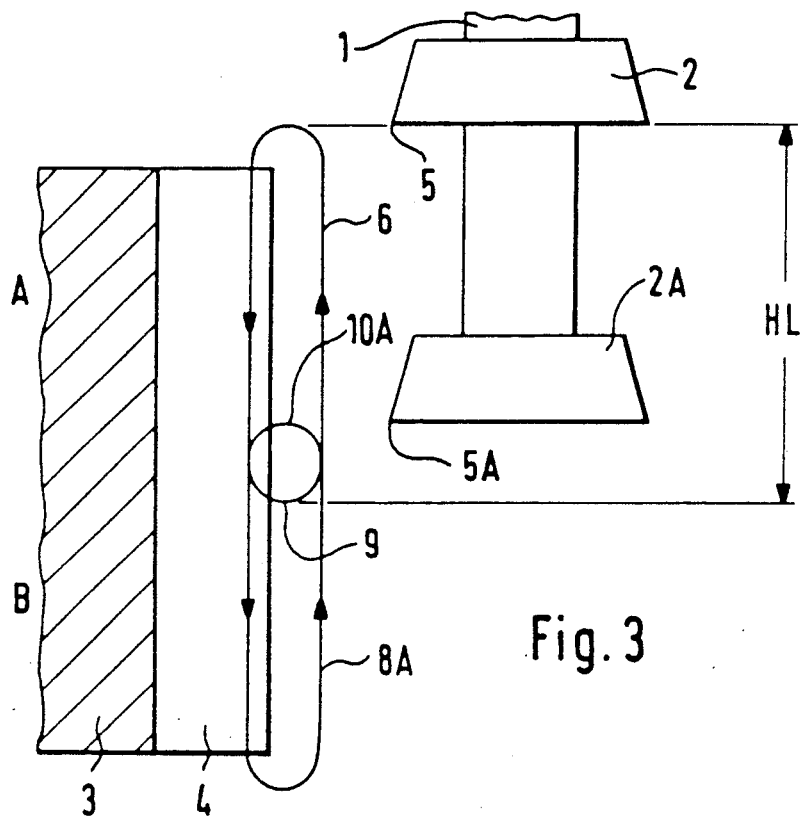
FIG. 3 is an illustration corresponding to FIG. 1 to explain a second example of the method.

With the form of operation shown in FIG. 3, no relocation of the stroke position as shown in FIG. 1 is necessary. Instead, two tools 2, 2A are arranged on the toolholder 1 being axially offset in relation to one another, the axial spacing between the tools 2, 2A corresponding to the distance HV of the shift in stroke position according to FIG. 1. The two tools 2, 2A move simultaneously over the paths 6, 8A and the runout zone 9 of the tool 2 and the entry zone 10A of the tool 2A overlap one another. The two portions A, B, that is to say the whole profile length PL, are machined simultaneously by the two tools 2, 2A.

As in the example of operation described previously, the distance between the tools and the workpiece 3 is reduced between successive stroke movements so that a profile 4 is produced with increasing depth until the final profile depth is reached.

Figure 4:
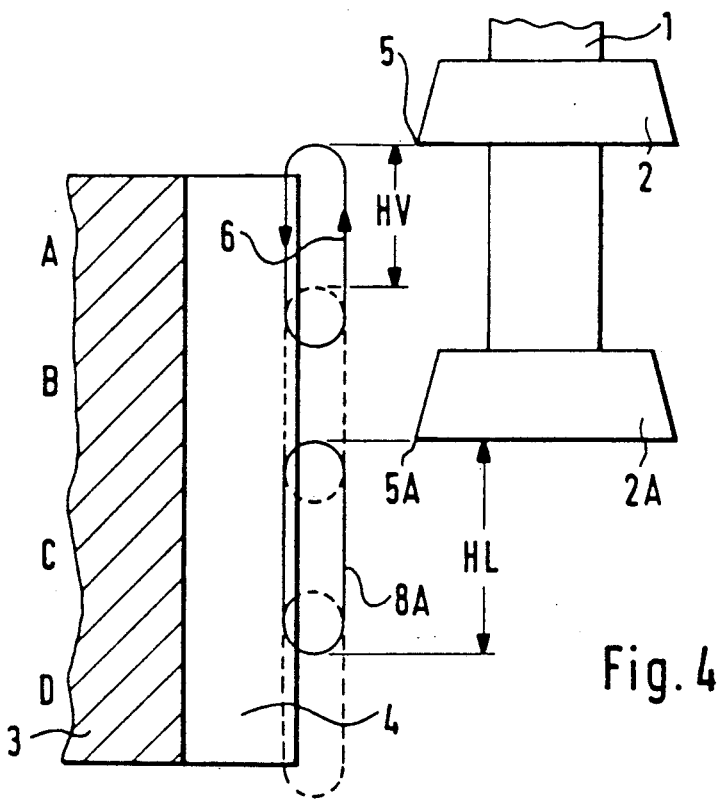
FIG. 4 is an illustration corresponding to FIG. 1 to explain a third example of the method, which draws on a combination of the first and second examples.

In the modified method shown in FIG. 4, two tools 2, 2A are again disposed on the toolholder 1 as is the case in FIG. 3 but a relocation of stroke position through the distance HV is additionally provided in accordance with FIG. 1. In the example of operation shown, the axial spacing between the tools 2, 2A seen in the stroke direction is twice as great as the magnitude of the shift in stroke position. Thus, the length of the profile 4 can be divided into the portions A, B, C and D.

In a first step, the portions A and C are machined by the tools 2, 2A and this is done with a first profile depth 7 as explained with reference to FIG. 2. Then the toolholder 1 is displaced downwards by the distance HV to shift its stroke position so that then the portions B and D are machined with the profile depth 7.

After the toolholder 1 has been restored to the position shown in FIG. 4, the distance between workpiece 3 and the tools 2, 2A is reduced and then the portions A and C are machined to an increased profile depth. Then the toolholder 1 is displaced downwards by the amount HV as a result of which the portions B and D can then be machined to the increased depth.

The paths 6, 8A followed by the tips of the tools 2, 2A are illustrated in full lines in the upper position of the toolholder 1 and in broken lines after displacement by the distance HV. As in the examples previously described, the entry and exit regions 9, 10 of the tools 2, 2A overlap one another.

Figure 5:
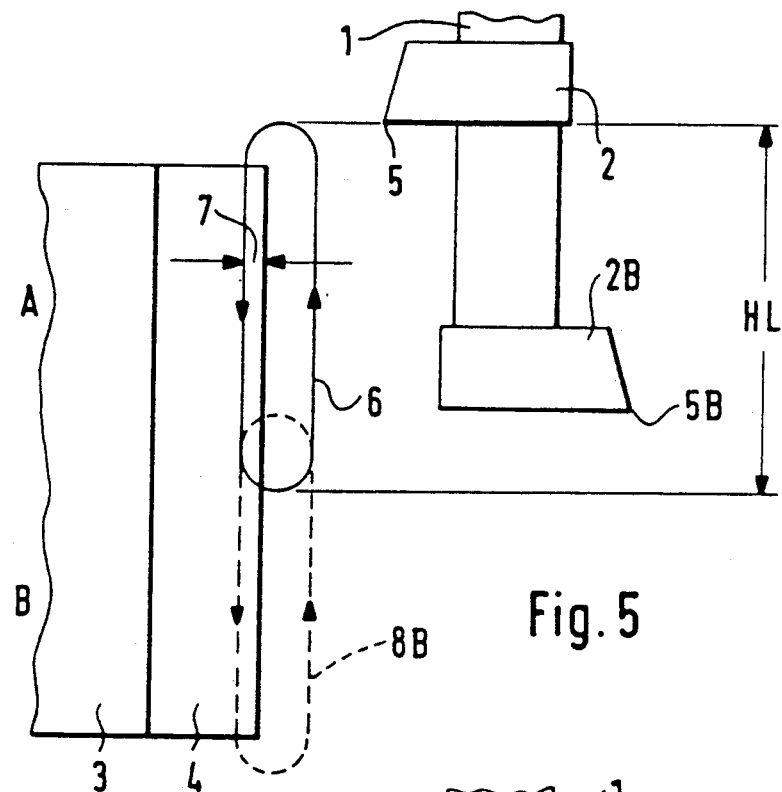
FIG. 5 is an illustration corresponding to FIG. 1 to explain a fourth example of the method.

In the example shown in FIG. 5, two shaper cutters 2, 2B are disposed on the toolholder 1 offset in the axial direction and also offset by 180° in relation to one another. After the region A has been machined by the tool 2 with the profile depth 7, the toolholder 1 is turned through 180° so that now the portion B is machined by the tool 2B with the profile depth 7. After another rotation of the toolholder 1 through 180° and a reduction in the distance between the toolholder 1 and the workpiece 3 by a further profile depth 7, machining of the portion A is again effected. Then the toolholder 1 is rotated through 180° to machine the portion B to increase the profile depth. The rotation of the toolholder 1 is repeated, as is the infeed movement of the workpiece 3 after each two turns of the toolholder 1, until the final profile depth of the profile 4 is reached. The tools 2, 2B may also be arranged offset in relation to one another by an angle other than 180°, and the toolholder 1 is then turned through the corresponding angle to bring the tools alternatively to an operative position.

Figure 6:
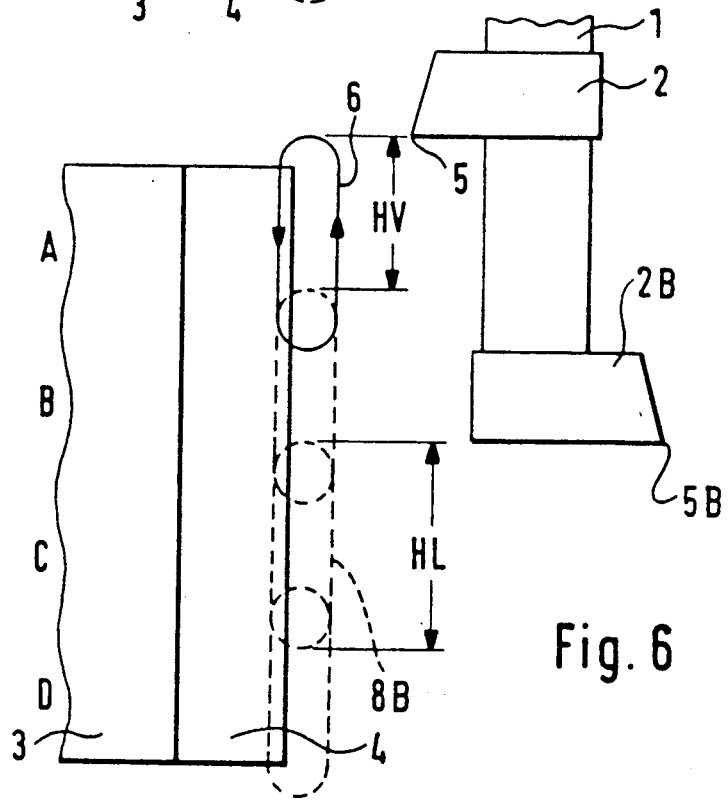
FIG. 6 is an illustration corresponding to FIG. 1 to explain a fifth example of the method which results from the combination of the first and fourth examples.

With the method shown in FIG. 6, two tools 2, 2B are again provided on the toolholder 1 as in FIG. 5, offset by 180°, and in addition a shift HV in the stroke position of the toolholder 1 is possible. The axial spacing between the tools 2, 2B is twice as great as the shift HV in stroke position. The profile 4 is again divided into four portions A, B, C, D in the longitudinal direction. The portion A is first machined with the profile depth 7. Then the toolholder 1 is displaced the distance HV so that now the portion B is machined by the tool 2. Alternatively to this, it is possible, without a shift in the stroke position, to machine the portion C after the portion A by turning the toolholder 1 and only after that to relocate the toolholder 1 by the amount HV.

With the forms of operation shown in FIGS. 4 and 6, profile lengths PL can be produced by the same machine which are twice as long as is the case in the forms of operation shown in FIGS. 3 and 5.

The stroke length HL can be varied according to the machine task. This will be explained with reference to FIG. 1. If the profile is to be rough-machined for example, the maximum stroke length HL is set so that the machining regions A, B result. On the other hand, if the profile is to be finish-machined, it is possible to reduce the stroke length HL by half for example so that the regions A and B are each divided into two component machining regions. The magnitude of the stroke adjustment between the machining of two adjacent component regions is then likewise reduced to half.

Figure 7:
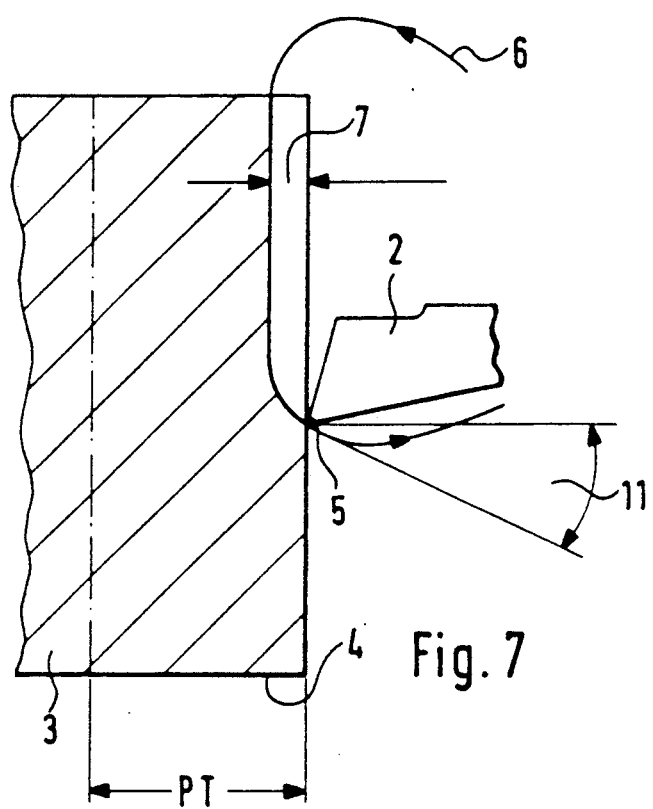
FIG. 7 is an illustration of the conditions on the run-out of a tool from a workpiece in performing the method according to the invention.

FIG. 7 illustrates the conditions when the tool enters its cutting stroke from outside the workpiece and the tool runout is effected inside the workpiece. In this case, it is a matter, for example, of the conditions in the region A of FIG. 1 before the relocation of the stroke position. The minimum cutting angle 11 is the angle which results at the runout point between a horizontal line and the tangent of the path 6 of the tool.

Figure 8:
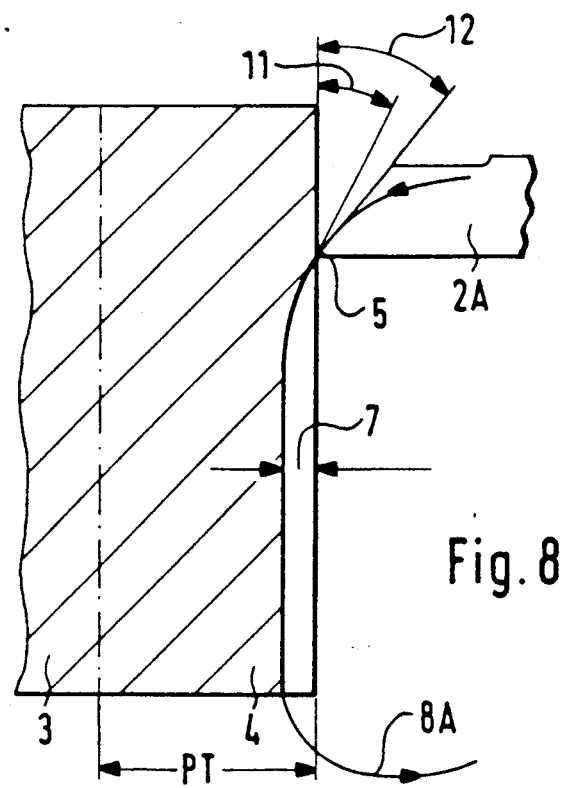
FIG. 8 is an illustration of the conditions on the entry of a tool into a workpiece in performing the method according to the invention.

The conditions with a tool entering its cutting stroke inside the workpiece and a tool runout outside the workpiece are shown in FIG. 8. These conditions occur, for example, with the method shown in FIG. 4 in the case of the tool 2A there, before the relocation of the stroke position. The maximum permissible cutting angle 11A in the case of the tool 2A results at the entry point between a vertical line and a tangent on the curved path 8A of the tool. The corresponding greater clearance angle is designated by 12.

Figure 9:
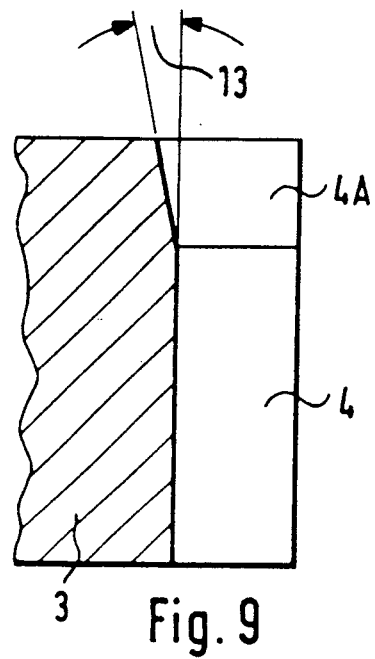
FIG. 9 shows a gear-wheel profile with longitudinal correction of the profile.
Figure 10:
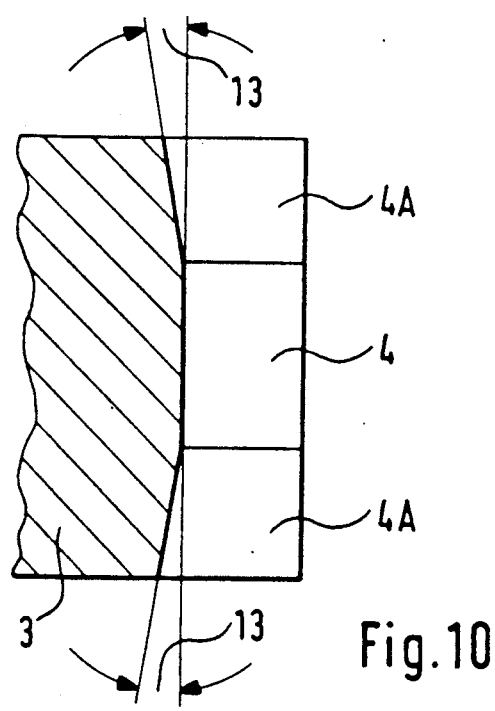
FIG. 10 shows a further gear-wheel profile with longitudinal correction of the profile.

In FIGS. 9 and 10, longitudinal corrections to the profile are illustrated. According to FIG. 9, an upper profile portion 4A is inclined in relation to the profile portion 4. The angle of inclination is designated by 13. In a gear generator, this longitudinal correction is obtained in that, during the machining of the profile portion 4A, the ram spindle guiding the cutting tool moves inclined to the axis of the workpiece 3. During the machining of the portion 4, the ram spindle and the axis of the workpiece extend parallel to one another.

In the form of operation shown to FIG. 10, the profile is corrected by the angle 13 at both ends of its length.

Figure 11:
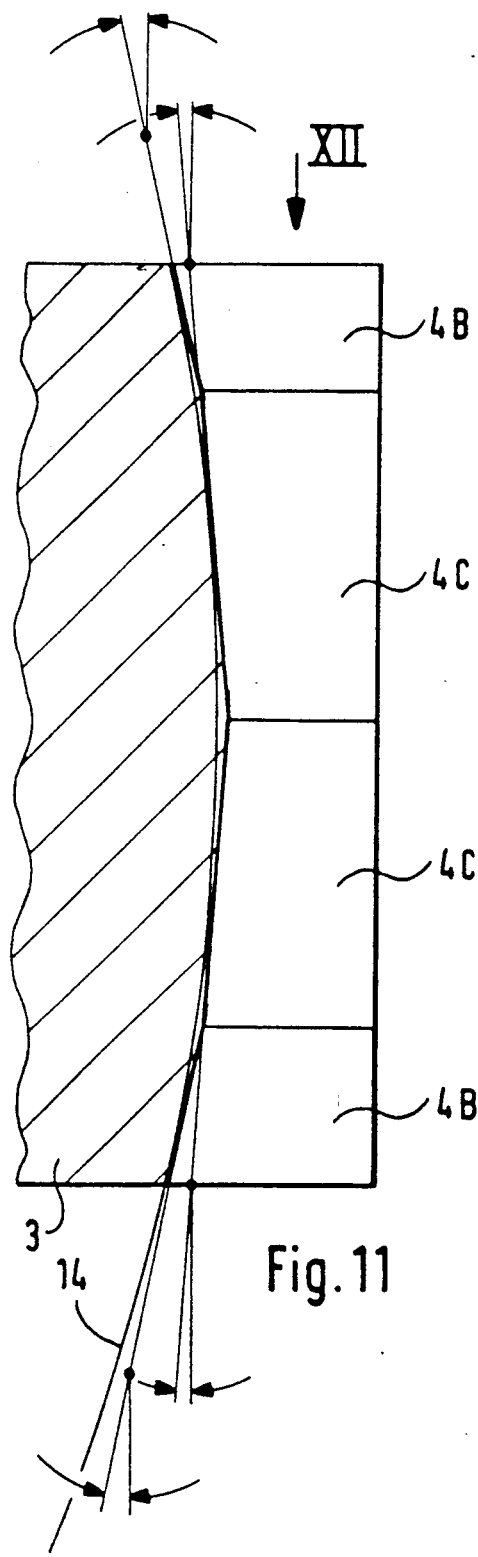
FIG. 11 shows a further gear-wheel profile with longitudinal correction of the profile produced by enveloping cuts and FIG. 12 shows a view of the profile of FIG. 11 in the direction of the arrow XII in that figure.
Figure 12:
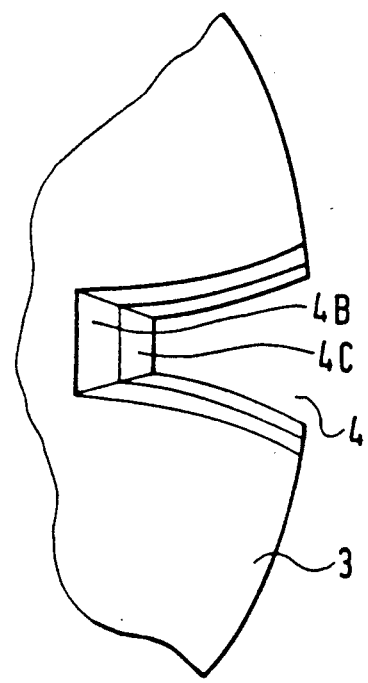

In the examples of FIGS. 11 and 12, the profile comprises four portions 4B, 4C, the two portions 4C adjacent to one another having equal but opposite correction angles. The outer profile portions 4B similarly have equal and opposite correction angles but of a greater magnitude than the portions 4C. In this manner, enveloping cuts are produced which extend tangentially to a desired correction curve 14.

As already mentioned previously, the relocation of the stroke position can be effected by axial adjustment of the toolholder or of the tool slide. In a gear generating machine, the effect is achieved through an axial adjustment of the toolholder, that on the shift of the stroke position by axial adjustment of the toolholder there is obtained an uninterrupted continuation of the helical lines over the whole profile length as a result of the helical guidance of the toolholder. In order to achieve this also with an axial adjustment of the tool slide or of the work-carrier, a rotation about the axis of rotation of tool and/or workpiece, depending on the magnitude of the shift in stroke position, must be carried out with this axial adjustment.

I claim:

1. A method of producing a profiled workpiece on a machine tool having respective means for holding at least one planing or broaching forming tool that forms a workpiece during a reciprocating stroke and for holding a workpiece; said method comprising the steps of performing reciprocating stroke movements between the respective holding means, whereby said at least one tool forms a profile on the workpiece along a length of the workpiece in the direction of said movement; selecting said reciprocating stroke movements to be equal and shorter than said length of the workpiece; dividing said length of the workpiece into at least two portions; and forming said profile separately in each of said at least two portions with said selected stroke movement.

2. A method according to claim 1 wherein the profiled portions are produced in succession, after the profile of one of said portions having been formed the relative position in the direction of stroke movement between said tool and the workpiece being altered to form a second of said portions in succession to said one portion.

3. A method of producing a profiled workpiece on a machine tool having respective means for holding at least one planing or broaching forming tool that forms a workpiece during a reciprocating stroke and for holding a workpiece; said method comprising the steps of performing a reciprocating stroke movement between the respective holding means, whereby said at least one tool forms a profile on the workpiece along a length of the workpiece in the direction of said movement; selecting said reciprocating stroke movement to be shorter than said length of the workpiece; dividing said length of the workpiece into at least two portions; and forming said profile separately in each of said at least two portions with said selected stroke movement wherein respective profiled portions are produced by at least two said forming tools offset in relation to one another in the direction of stroke movement.

4. A method according to claim 3 wherein said at least two tools form the respective profiled portions simultaneously.

5. A method according to claim 3 wherein said at least two tools are offset relative to each other transversely to said direction of stroke movement and after the one profiled portion has been produced by a first said tool, the tools are displaced in said direction of said offset to produce a further profiled portion using a second said tool.

6. A method according to claim 3 wherein after the tools have each formed first profiled portions, said tools are jointly adjusted in the direction of stroke movement and at least one further profiled portion is formed by at least one of the tools.

7. A method according to claim 1 wherein the distance between the tool and the workpiece is reduced between successive stroke movements of the tool for the production of a profiled portion.

8. A method according to claim 7 wherein the profile is formed in said portions to a first profile depth and the distance between said at least one tool and the workpiece is then reduced for forming the profile in further portions to a greater profile depth and, if required, the steps of reducing said distance and forming further profiled portions are repeated until the profile on the workpiece has been formed to a final profile depth.

9. A method according to claim 1 wherein in one direction of the stroke movement said at least one tool is in engagement with the workpiece and in an opposite direction of movement to said one direction the tool and workpiece are held at a spacing each other.

10. A method according to claim 9 wherein the amount of said spacing is adjustable.

11. A method of producing a profiled workpiece on a machine tool having respective means for holding at least one planing or broaching forming tool that forms a workpiece during a reciprocating stroke and for holding a workpiece; said method comprising the steps of performing a reciprocating stroke movement between the respective holding means, whereby said at least one tool forms a profile on the workpiece along a length of the workpiece in the direction of said movement; selecting said reciprocating stroke movement to be shorter than said length of the workpiece; dividing said length of the workpiece into at least two portions; and forming said profile separately in each of said at least two portions with said selected stroke movement, and each said tool passes through respective entry and exit zones on the workpiece in forming a profiled portion and the entry and exit zones of adjacent portions are overlapped.

12. A method according to claim 1 in which the workpiece has a central axis of rotation and is rotationally symmetrical about said axis, and wherein the profile is produced portion by portion in the circumferential direction of said workpiece, the workpiece being rotated about its axis of rotation.

13. A method of producing a profiled workpiece on a machine tool having respective means for holding at least one planing or broaching forming tool that forms a workpiece during a reciprocating stroke and for holding a workpiece; said method comprising the steps of performing a reciprocating stroke movement between the respective holding means, whereby said at least one tool forms a profile on the workpiece along a length of the workpiece in the direction of said movement; selecting said reciprocating stroke movement to be shorter than said length of the workpiece; dividing said length of the workpiece into at least two portions; and forming said profile separately in each of said at least two portions with said selected stroke movement, such that the workpiece has a central axis of rotation and is rotationally symmetrical about said axis, and wherein the profile is produced portion by portion in the circumferential direction of said workpiece, the workpiece being rotated about its axis of rotation, and said at least one tool is a gear-shaping cutter which operates by the generating method, said tool having an axis of rotation about which it is rotated to and fro interdependently with said stroke movement of the tool.

14. A method according to claim 13 wherein the position of the tool in the direction of stroke movement is altered between the formation of adjacent profiled portions.

15. A method according to claim 13, for use with said at least one forming tool held by said holding means on a tool slide and wherein, between the formation of adjacent profiled portions, the axial position of at least one of said tool slide and said holding means is altered and the rotational position of at least one of said tool and said workpiece is altered, dependent upon said change in axial position.

16. A method according to claim 13, wherein the cutting direction of said at least one tool is altered in a step intervening between the formation of two adjacent profiled portions.

17. A method according to claim 13, wherein the relative speed between said tool and workpiece is varied during at least one of a working stroke and a return stroke of said stroke movement.

18. A method according to claim 13 in which the holding means for the workpiece and for said tool have respective axes of rotation, at least one of said holding means is adjusted transversely to a line connecting said respective axes selectively, in combination with alteration of the distance between said axes and/or of the axis of rotation of the tool holding means and/or of the axis of rotation of the workpiece holding means and/or of the inclination between the axis of rotation of the tool holding means and the direction of stroke movement.

19. A method of producing a profiled workpiece on a machine tool having respective means for holding at least one planing or broaching forming tool that forms a workpiece during a reciprocating stroke and for holding a workpiece; said method comprising the steps of performing a reciprocating stroke movement between the respective holding means, whereby said at least one tool forms a profile on the workpiece along a length of the workpiece in the direction of said movement; selecting said reciprocating stroke movement to be shorter than said length of the workpiece; dividing said length of the workpiece into at least two portions; and forming said profile separately in each of said at least two portions with said selected stroke movement, such that the workpiece has a central axis of rotation and is rotationally symmetrical about said axis, and wherein the profile is produced portion by portion in the circumferential direction of said workpiece, the workpiece being rotated about its axis of rotation, and said axis of rotation of the workpiece is adjustable relative to the stroke direction of the tool at different angular settings between the forming of respective profiled portions.

20. A method according to claim 19 wherein said adjustment is used to give inclinations between positive and negative angles for said angular settings from portion to portion.

21. A method of producing a profiled workpiece on a machine tool having respective means for holding at least one planing or broaching forming tool that forms a workpiece during a reciprocating stroke and for holding a workpiece; said method comprising the steps of performing a reciprocating stroke movement between the respective holding means, whereby said at least one tool forms a profile on the workpiece along a length of the workpiece in the direction of said movement; selecting said reciprocating stroke movement to be shorter than said length of the workpiece; dividing said length of the workpiece into at least two portions; and forming said profile separately in each of said at least two portions with said selected stroke movement, wherein the profile depth is varied in a selectable manner along the length of the workpiece.

* * * * *